US012756923B2

(12) United States Patent
Gupta et al.

(10) Patent No.: US 12,756,923 B2
(45) Date of Patent: Oct. 6, 2026

(54) CAPTURING SELF-PHOTO IMAGES IN AN ELECTRONIC DEVICE

(71) Applicant: MOTOROLA MOBILITY LLC, Wilmington, DE (US)

(72) Inventors: Ranjeet Gupta, Aurora, IL (US); Rahul Bharat Desai, Hoffman Estates, IL (US)

(73) Assignee: Motorola Mobility LLC, Chicago, IL (US)

( * ) Notice: Subject to any disclaimer, the term of this patent is extended or adjusted under 35 U.S.C. 154(b) by 37 days.

(21) Appl. No.: 18/945,919

(22) Filed: Nov. 13, 2024

(65) Prior Publication Data

US 2026/0136087 A1 May 14, 2026

(51) Int. Cl.
*H04N 23/611* (2023.01)
*G06T 7/70* (2017.01)

(52) U.S. Cl.
CPC ............. *H04N 23/611* (2023.01); *G06T 7/70* (2017.01); *G06T 2207/30201* (2013.01)

(58) Field of Classification Search
CPC .................... H04N 23/611; G06T 7/70; G06T 2207/30201
USPC ....................................................... 348/222.1
See application file for complete search history.

(56) References Cited

U.S. PATENT DOCUMENTS 10,075,629 B2 * 9/2018 Wada ..................... H04N 23/64
10,733,279 B2 * 8/2020 Andalo ................... G06F 17/18
11,310,433 B1 * 4/2022 Huffman ................ H04N 23/69
11,360,555 B2 * 6/2022 Weng ....................... G06F 3/013
11,659,266 B2 * 5/2023 Gruhlke .................. G06F 3/013 345/156
11,670,114 B2 * 6/2023 Oh .......................... G06F 18/22 382/190
11,758,260 B1 * 9/2023 Agrawal ................ H04N 23/90 348/333.03

(Continued)

FOREIGN PATENT DOCUMENTS

WO 2022/271681 A1 12/2022

OTHER PUBLICATIONS

International Search Report and Written Opinion, International Application No. PCT/US2025/022188, Jul. 30, 2025.

(Continued)

*Primary Examiner* — Pritham D Prabhakher
(74) *Attorney, Agent, or Firm* — Isidore PLLC

(57) ABSTRACT

An electronic device, a method and a computer program product provide techniques for automating self-image capturing, via a camera, when the device is in an always on camera mode. The method includes determining if a captured image stream contains a face of a user. In response to determining the image stream contains the face of the first user, the method includes determining whether an eye gaze direction of the user corresponds to a direction of the camera. In response to determining the user is looking towards the direction of the camera, the method includes determining if the electronic device is in an orientation that corresponds with the user taking a self-image. In response to determining the electronic device is in a selfie-taking orientation, while the user is looking towards the direction of the camera, the method includes autonomously capturing, via the camera, a self-photo image and storing the self-photo image.

20 Claims, 7 Drawing Sheets

(56) References Cited

U.S. PATENT DOCUMENTS

| | | | | |
|---|---|---|---|---|
| 12,141,998 | B2 * | 11/2024 | Agrawal | G06F 3/013 |
| 12,154,379 | B2 * | 11/2024 | Oh | G06V 40/174 |
| 12,309,524 | B2 * | 5/2025 | Agrawal | G06T 5/50 |
| 2010/0225773 | A1 * | 9/2010 | Lee | H04N 23/64<br>348/222.1 |
| 2014/0123507 | A1 * | 5/2014 | Gupta | G06T 7/70<br>33/1 M |
| 2016/0124249 | A1 * | 5/2016 | Haddadi | G02C 13/003<br>351/204 |
| 2016/0323503 | A1 | 11/2016 | Wada | |
| 2018/0007255 | A1 | 1/2018 | Tang | |
| 2019/0278894 | A1 | 9/2019 | Andalo et al. | |
| 2019/0356838 | A1 | 11/2019 | Lake et al. | |
| 2019/0379822 | A1 * | 12/2019 | Leong | G06F 3/012 |
| 2020/0371586 | A1 * | 11/2020 | Weng | G06F 3/013 |
| 2022/0121841 | A1 * | 4/2022 | Oh | G06F 18/22 |
| 2022/0124242 | A1 * | 4/2022 | Gruhlke | G06F 3/013 |
| 2023/0260324 | A1 * | 8/2023 | Oh | G06F 18/22<br>382/190 |
| 2023/0276115 | A1 * | 8/2023 | Agrawal | H04N 23/695<br>348/333.03 |
| 2023/0298197 | A1 * | 9/2023 | Agrawal | G06F 3/013<br>345/174 |
| 2024/0144718 | A1 * | 5/2024 | Chen | G06F 3/14 |
| 2024/0221155 | A1 * | 7/2024 | Chang | A61B 3/14 |
| 2024/0430378 | A1 * | 12/2024 | Agrawal | H04N 23/635 |
| 2025/0014189 | A1 * | 1/2025 | Yuksel | G06F 3/013 |

OTHER PUBLICATIONS

Valliappan et al., "Accelerating eye movement research via accueate and affordable smartphone eye tracking." Nature communications 11.1 (2020): 4553. Retrieved on Jul. 13, 2025 (Jul. 13, 2025) from <https://www.nature.com/articles/s41467-020-18360-5.pdf>.

* cited by examiner

CAPTURING SELF-PHOTO IMAGES IN AN ELECTRONIC DEVICE

BACKGROUND

1. Technical Field

The present disclosure generally relates to electronic devices and in particular to capturing images using a camera in an electronic device.

2. Description of the Related Art

Electronic devices, such as mobile phones, tablets, and laptops, are widely used for video, voice, and text communication and for data transmission. Many conventional electronic devices have at least one front facing camera and one or more rear facing cameras. Electronic devices with cameras can be used to capture various images within a field of view of the camera. An electronic device user can also choose to capture an image of themselves that is referred to as a self-image or a "selfie".

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1A:
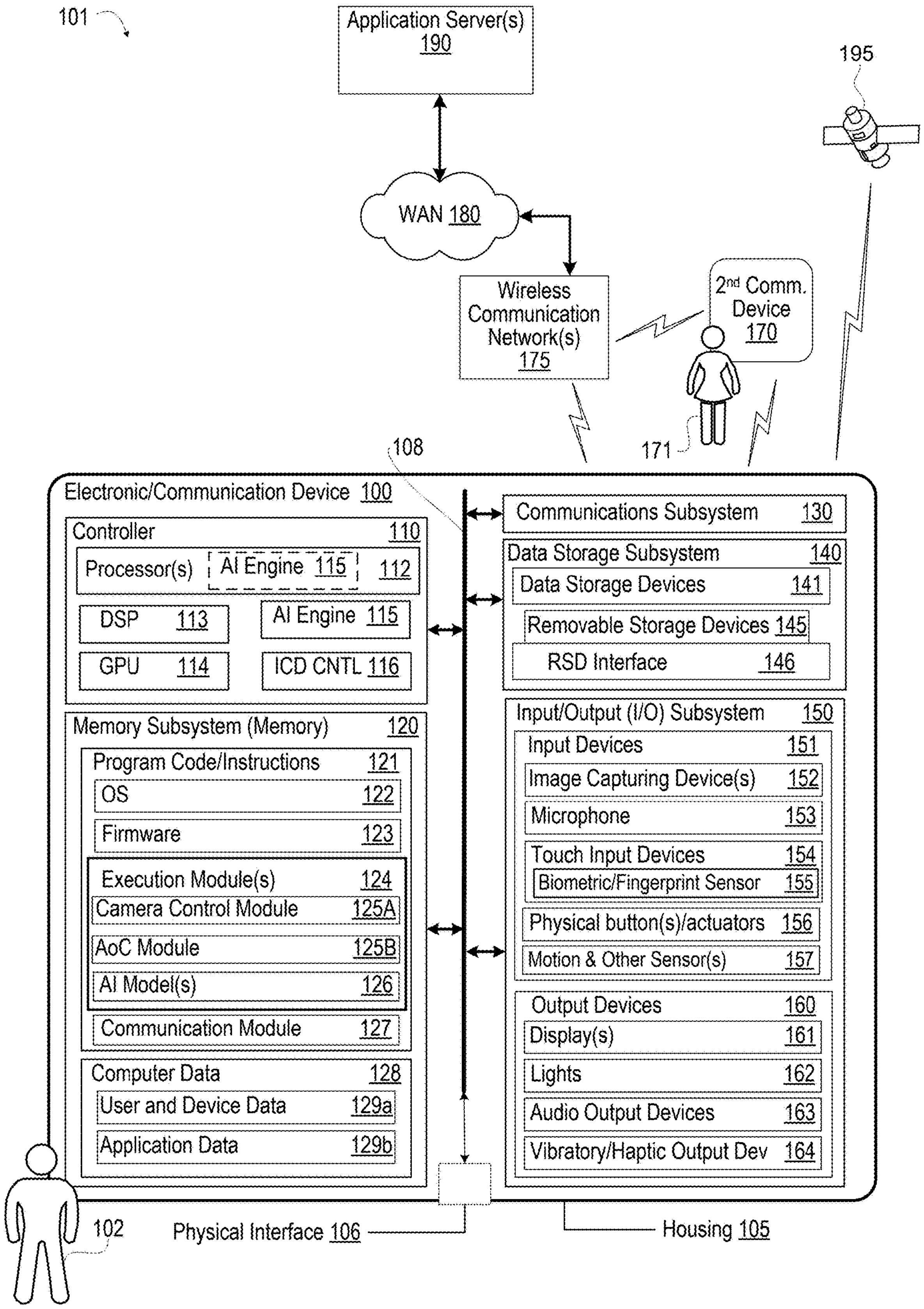
FIG. 1A presents a functional block diagram of example components of an electronic device in a communication environment and having hardware and software components that enable the features of the present disclosure to be advantageously implemented, according to one or more embodiments.

According to one or more aspects of the disclosure, the illustrative embodiments provide an electronic device, a method, and a computer program product for enabling automatic capturing of a self-photo image based on a detection of a face within a field of view (FOV) of a camera, when the device is moved into an self-image-capturing orientation while the camera is in an always on camera (AoC) mode.

The term AoC generally refers to the capability of a camera to be constantly active, monitoring or capturing an image stream or video, even when the camera and/or the electronic device is not in active use by a user of the electronic device. An AoC mode is a feature provided with some electronic devices that include one or more cameras (or image capturing devices). For example, a smart home device such a smart security camera can be configured with an AoC mode. An electronic device such as smartphone can also have an AoC mode that can be selectively activated. An electronic device having AoC can provide constant monitoring and motion detection of objects captured within a captured image stream. An electronic device having AoC can provide surveillance of an area within a field of view of the AoC. It is common for electronic device users to take photos of themselves, using the cameras of their handheld devices to produce an image that is colloquially referred to as a selfie or self-photo. To capture a self-photo, and in particular one including the user's face, the electronic device user can hold the electronic device using their arm and hand extended outwards, at a position with the face of the user positioned within the field of view (FOV) of the device camera. When the electronic device operates in the AoC mode, the electronic device can have difficulty determining when to capture a desired self-photo because the electronic device is always capturing an image stream. To capture a self-photo while the device is in the AoC mode, a user may need to hold the electronic device in one hand and manually select a touch input screen with their other hand to capture the self-photo. Frequently, a user may be using one or more hands for other tasks and not have both hands free to capture the self-photo. In addition, if the electronic device is a foldable electronic device that is in a folded position, manually activating the camera to capture a self-photo is difficult because the activation of the camera may require unfolding the phone to access a touch input screen to initiate the self-photo.

The embodiments disclosed herein addresses and overcome the aforementioned issues with capturing self-photos while an electronic device is operating in an AoC mode by configuring the device to monitor for and detect when the eye gaze direction of the user is looking in the direction of the always on camera contemporaneously with detecting that the electronic device is positioned (or moved so as to become positioned) within a pre-established orientation parameters and distance or range to the camera that corresponds to the user preparing to take a self-photo. Range is defined as the distance between the camera and the user's face. In response to determining that the user's gaze direction and the electronic device's orientation and range correspond to the user preparing to take a self-photo (i.e., the user is looking towards the direction of the camera and the electronic device is positioned within an orientation and at a range that corresponds to the user taking a self-photo), the electronic device automatically captures and stores a self-photo image. The embodiments disclosed herein enable a user to capture a self-photo without having to manually touch a button or a touch input screen. The embodiments disclosed herein improve the technology associated with use of the electronic device as a camera by enabling the electronic device to automatically capture a self-photo without requiring manual input/selection of a capture function.

In a first embodiment, an electronic device includes a first camera and a memory having stored thereon a camera control module for controlling image capturing via the first camera. The electronic device includes at least one processor that is communicatively coupled to each of the first camera and the memory, and which executes program code of the camera control module. The at least one processor is configured to cause the electronic device to, while the electronic device is operating in an always on camera (AoC) mode, determine if a first image stream captured, via the first camera, contains a face of a first user. In response to determining the first image stream contains the face of the first user, the at least one processor determines whether a first eye gaze direction of the first user corresponds to a direction of the first camera. In response to determining the first user is looking towards the direction of the first camera, the at least one processor determines if the electronic device is positioned with a first orientation and within a range from the detected face of the user that corresponds with the first user taking a self-image or self-photo image. In response to determining the electronic device is oriented with the first orientation and within the range, while the first user is looking towards the direction of the first camera, the at least one processor captures, via the first camera, a self-photo image and stores the self-photo image. It is appreciated that the sequence of the above-described processes can vary. For example, in one or more embodiments, the detection of the orientation and range of the device occurs prior to determining if the user is facing the camera. Accordingly, the check of the captured image stream for a face of a person is only triggered when the device is physically moved or positioned into the orientation/position for taking a self-photo.

According to another embodiment, the method includes, while an electronic device is operating in an always on camera (AoC) mode, determining, via at least one processor of the electronic device, if a first image stream captured via a first camera of the electronic device contains a face of a first user. In response to determining the first image stream contains the face of the first user, the method includes determining whether a first eye gaze direction of the first user corresponds to a direction of the first camera. In response to determining the first user is looking towards the direction of the first camera, the method includes determining if the electronic device is oriented within a first orientation and range that corresponds with the first user taking a self-image. In response to determining the electronic device is oriented within the first orientation and range, while the first user is looking towards the direction of the first camera, the method includes capturing, via the first camera, a self-photo image and storing the self-photo image.

According to an additional embodiment, a computer program product includes a computer readable storage device having stored thereon program code that, when executed by at least one processor of an electronic device having a first camera, the program code enables the electronic device to complete the functionality of the above-described method processes.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent within the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within electronic device 100 (FIG. 1A-1B) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural, functional, operational, or otherwise) on the described embodiments.

Referring now to the figures and beginning with FIG. 1A, there is illustrated a block diagram of an example electronic device 100 in a communication environment 101 and having hardware and software components, which enable the features of the present disclosure to be advantageously implemented, according to one or more embodiments. Examples of electronic device 100 can include, but are not limited to, mobile devices, a notebook computer, a mobile phone, a smart phone, a digital camera with enhanced processing capabilities, a smart watch, a tablet computer, and other types of electronic devices.

Electronic device 100 generally includes controller 110, memory (or memory subsystem) 120, communication subsystem 130, data storage subsystem 140, input/output subsystem 150, all contained within or extended from an exterior surface of device housing 105. Controller 110 is shown communicatively connected/coupled via system interlink 108 with each of the subsystems 120, 130, 140, and 150, and is directly or indirectly connected with the individual components within each subsystem 120, 130, 140, and 150. System interlink 108 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components.

Controller 110 includes processor 112, which includes one or more central processing units (CPUs) or data processors. Processor 112 performs many of the features of controller 110 and references to features performed by controller 110 can be interchangeably referred to herein as features of processor 112, and vice-versa. In some embodiments, the various functions associated with controller 110 are integrated into processor 112, and accordingly, references made herein to controller and/or processor are understood to refer to one or both components as providing a single management component within the electronic device 100. For simplicity in describing the features of the electronic device 100, the operational functions provided by one or more of operational components within controller 110, including those provided by processor 112 are collectively described as being performed by controller 110. Collectively, components integrated within controller 110 support computing, classifying, processing, transmitting and receiving of data and information, and presenting of graphical and photographic images within a display.

As illustrated, controller 110 can also include one or more digital signal processors 113, graphics processing units (GPUs) 114, artificial intelligence (AI) engine 115, and image capturing device (ICD) controller 116. In some embodiments, the functionality of each of these additional processing components can be integrated with processor(s) 112. For example, processor 112 can, in some embodiments, include dedicated AI engine 115 and image signal processors (ISPs) (not shown).

Controller 110 manages, and in some instances directly controls, the various functions and/or operations of communication device 100. These functions and/or operations include, but are not limited to including, application data processing, communication, location and navigation tasks, image processing, and signal processing. In one or more alternate embodiments, electronic device 100 may use hardware component equivalents for application data processing and signal processing. For example, electronic device 100 may use special purpose hardware, dedicated processors, general purpose computers, microprocessor-based computers, micro-controllers, optical computers, analog computers, dedicated processors and/or dedicated hard-wired logic. Controller 110 can, in some embodiments, also include a hardware acceleration (HA) unit, which can establish direct memory access (DMA) sessions to route network traffic to various elements within electronic device 100 without direct involvement from processor 112 and/or a device operating system 122.

Memory subsystem (or memory) 120 may include a combination of volatile and non-volatile memory, such as random-access memory (RAM) and read-only memory (ROM). Memory subsystem 120 stores program code/instructions 121 for execution by processor 112 to configure processor 112 (and more generally electronic device 100) to provide the operational functions and features described herein. Program code/instructions 121 (or program code 121 for short) include instructions for an operating system (OS) 122, firmware 123, such as basic input/output system (BIOS) or Uniform Extensible Firmware Interface (UEFI). Program code 121 includes execution module(s) 124 that collectively provides the various features of the disclosure. Execution module(s) 124 include, without limitation, camera control module 125A and AoC module 125B, which provides the features and operating functionality of the disclosed embodiments when the corresponding program instructions of camera control module 125A and AoC module 125B are processed by/within processor 112/controller 110. Specifically, camera control module 125A provides program instructions for controlling self-photo image capturing, via a camera, when the camera is in an always on camera mode. AoC module 125B provides program instructions for operating an AoC camera of an electronic device.

Execution modules 124 further includes AI model(s) 126. In one or more embodiments, processor 112 can utilize AI models 126 to provide AI functionality of processor-integrated AI engines 115. In other embodiments, AI models 126 are directly utilized by AI engine 115. In one or more embodiments, AI model 126 is integrated as a sub-module within camera control module 125A and is trained to support the AI features of camera control module 125A. AI model(s) 126 may include an artificial neural network, a decision tree, a support vector machine, Hidden Markov model, linear regression, logistic regression, Bayesian networks, and so forth. AI model(s) 126 can be individually trained to perform specific tasks and can be arranged in different sets of AI models to generate different types of output. Training of AI model(s) 126 is the process by which AI models are trained to perform specific tasks or achieve certain objectives. The training involves providing the model with a large amount of data and allowing the model to learn from patterns and relationships within that data.

Each of the above-introduced module(s) and/or application(s) provides program instructions/code that are processed by processor 112 and which configures processor 112 (and/or controller 110) and/or other operational components of electronic device 100 to cause the electronic device 100 to perform specific operations and functions, as described herein. Descriptive names assigned to these modules add no functionality and are provided solely to assist in identify the underlying features performed by processing the different modules. For example, camera control module 125A can include program instructions that cause or configure processor 112 to cause electronic device 100 to capture self-photos, via a camera, when the camera is in an always on camera mode. Other features provided by camera control module 125A are described in further detail throughout this disclosure.

Program code 121 can further include instructions/code for other applications (not shown) providing different features of/within electronic device 100. In one or more embodiments, program code 121 may be integrated into a distinct chipset or hardware module as firmware that operates separately from other executable program code. Portions of program code 121 may be incorporated into different hardware components that operate in a distributed or collaborative manner.

Memory subsystem 120 also includes computer data 128. During execution of program code 121, processor 112 may access, use, generate, modify, store, or communicate computer data 128, such as user and device data 129*a* and application data 129*b*. Computer data 128 may incorporate "data" that originated as raw, real-world "analog" information that consists of basic facts and figures. Computer data 128 includes different forms of data, such as numerical data, images, coding, notes, and financial data, as well as data presenting video, graphics, text, and images. Computer data 128 may originate at electronic device 100 or may be retrieved from a remote device via communications subsystem 130. Electronic device 100 may store, modify, present, or transmit computer data 128.

Communications subsystem 130 includes various components that enable electronic device 100 to communicate with external communication networks and other devices, such as second electronic device 170 and application server(s) 190, etc., via communications subsystem 130. According to one or more embodiments, communication module 127 presented within program code 121 includes instructions supporting the use of communications subsystem 130 to establish communication interfaces enabling communication by electronic device 100 with these external networks and devices.

Data storage subsystem 140 of electronic device 100 includes data storage device(s) 141. Controller 110 is communicatively connected, via system interlink 108, to data storage device(s) 141. Data storage subsystem 140 provides stored versions of program code 121 and computer data 128 on nonvolatile storage that is accessible by controller 110. The program code 121 can be loaded into memory 120 for execution/processing by controller 110. In one or more embodiments, data storage device(s) 141 can include hard disk drives (HDDs), optical disk drives, and/or solid-state drives (SSDs), etc.

Data storage subsystem 140 of communication device 100 can include removable storage device(s) (RSD(s)) 145, which is received in RSD interface 146. Controller 110 is communicatively connected to RSD 145, via system interlink 108 through RSD interface 146. In one or more embodiments, RSD 145 is a non-transitory computer program product or computer readable storage device that stores program code and associated data, including a copy of camera control module 125A, AoC module 125B, and AI model(s) 126, which may be executed by a processor associated with a user device, such as electronic device 100. Controller 110 can access data storage device(s) 141 or RSD(s) 145 to provision electronic device 100 with stored program code 121 and computer data 128 that, when executed/processed by processor 112, the program code configures processor 112 and/or more generally electronic device 100, to provide the various functions described herein.

I/O subsystem 150 includes input devices 151 such as, but not limited to, image capturing device(s) (ICDs) 152, microphone 153, and touch input devices 154 (e.g., touch screens, keys, or buttons) for use by user 102 to interface with electronic device 100. Touch input devices 154 can include a biometric/fingerprint sensor 155 for biometric input. Biometric/fingerprint sensor 155 can be used to read/receive biometric data, such as fingerprints, to identify or authenticate a user. In some embodiments, the biometric sensor 155 can supplement an ICD (camera), which captures images for user detection/identification via facial recognition.

Input devices 151 may include physical buttons/actuators 156 that can be located on a periphery of the device housing 105. Physical buttons 156 may provide controls for volume, power, and ICDs 152. Microphone 153 can also be referred to as an audio input device. In some embodiments, microphone 153 may be used for identifying a user via voiceprint, voice recognition, and/or other suitable techniques. Input devices 151 can also include one or more motion or other sensor(s) 157, which are further defined in the FIG. 1B description which follows.

Figure 1B:
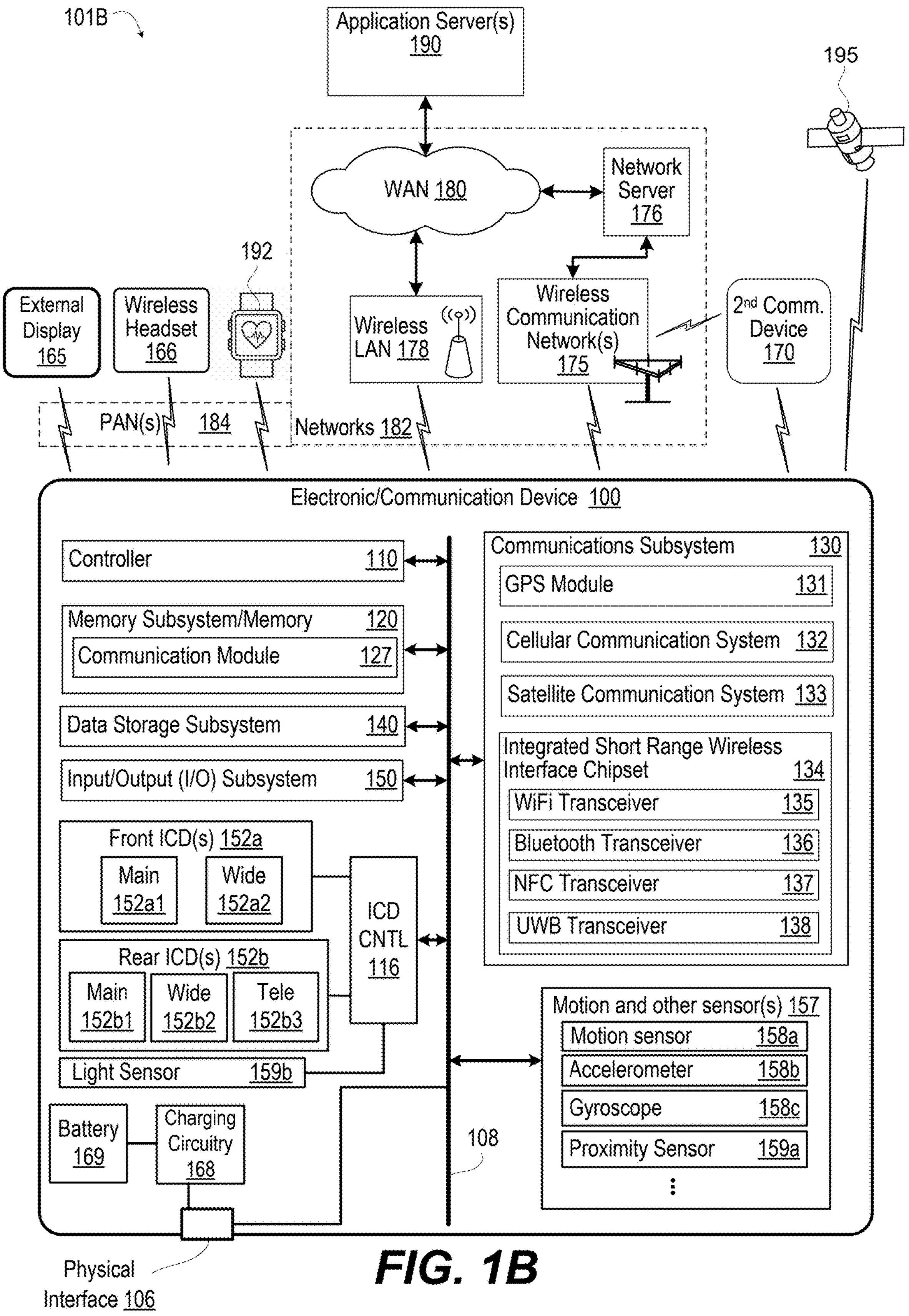
FIG. 1B is an additional block diagram representation of the electronic device of FIG. 1A presenting additional components, including components for wireless communications with other devices, according to one or more embodiments.

With reference to FIG. 1B, as illustrated, motion and other sensor(s) 157 of electronic device 100 include, but are not limited to, one or more motion sensor(s) 158*a*, one or more accelerometers 158*b*, one or more gyroscopes 158*c*, and proximity sensor 159*a*, etc. Motion sensor(s) 158*a* detect movement of electronic device 100 and provide motion data to processor 112 indicating the spatial orientation, position and movement of electronic device 100. Accelerometers 158*b* measure linear acceleration of movement of electronic device 100 in multiple axes (X, Y and Z). For example, accelerometers 158*b* can include three accelerometers, where one accelerometer measures linear acceleration in the X axis, one accelerometer measures linear acceleration in the Y axis, and one accelerometer measures linear acceleration in the Z axis. Accelerometers 158*b* can be used to calculate the orientation/position of electronic device 100 relative to the earth and can also be referred to as a gravity sensor. Gyroscope 158*c* measures rotation or angular rotational velocity of electronic device 100. Proximity sensor 159*a* senses the presence of nearby objects, including a person, such as a user. In one embodiment, proximity sensor 159*a* can be an infrared (IR) sensor that detects the presence of a nearby object, such as when electronic device 100 is brought close to a user. In an embodiment, proximity sensor 159*a* can determine the distance or range between electronic device 100 and a user. Electronic device 100 can also include one or more light sensors 159*b*, which detects the luminance and/or intensity (i.e., the amount) of ambient light surrounding the electronic device 100.

Referring again to FIG. 1A, I/O subsystem 150 includes output devices 160 such as, but not limited to, display(s) 161, lights 162, audio output devices 163, and vibratory and/or haptic output devices 164. In one or more embodiments, electronic device 100 includes an integrated display 161 which incorporates a tactile, touch screen interface that can receive user's tactile/touch input. As a touch screen device, integrated display 161 allows a user to provide input to and/or to control electronic device 100 by touching features within a user interface presented on integrated display 161. Tactile, touch screen interface (154) can be utilized as an input device. The touch screen interface 154 can include one or more virtual buttons or selectable affordances. In one or more embodiments, when a user applies a finger or stylus on the touch screen interface (154) in the region demarked by the virtual button, the touch of the region causes the processor 112 to execute code to implement a function associated with the virtual button. In some implementations, integrated display 161 is integrated into a front surface of electronic device housing 105 along with front image capturing devices (not specifically shown), while the higher quality ICDs are located on a rear surface of housing 105. Other embodiments provide for multiple integrated displays within electronic device 100 and references to display(s) 161 are assumed to refer to one or all of these multiple integrated displays.

Vibration/haptic output device 164 can cause electronic device 100 to vibrate or shake when activated. Vibration device 164 can be activated during an incoming call or message in order to provide an alert or notification to a user of electronic device 100. Audio output devices (e.g., a speaker) 163 can provide an audio alert or other audio output to a user. In one or more embodiments, integrated display 161, audio output devices (or speakers) 163, and vibration/haptic device 164 can generally and collectively be referred to as output devices.

With reference again to FIG. 1B and with continuing reference to FIG. 1A, there is presented another view of electronic device 100 with components enabling electronic device 100 to function as a mobile communication device, within an expanded communication environment 101B. In addition to the functional and operational components already presented by and described within the description of FIG. 1A, FIG. 1B further illustrates expanded communications subsystem 130 with additional communication components and interfaces enabling electronic device 100 to perform wireless communications within an expanded communication environment 101B that includes other devices.

Communications subsystem 130 includes global positioning system (GPS) module 131 that enables electronic device to communicate with and receive GPS location data from GPS satellite(s) 195. In one or more embodiments, GPS module 131 receives geospatial input from GPS broadcasts of time data and location data from GPS satellite(s) 195 to obtain geospatial location information about the physical location of electronic device 100.

In one or more embodiments, controller 110, via communications subsystem 130, performs multiple types of cellular over-the-air (OTA) or non-cellular wireless communication, such as by using a Bluetooth connection or other personal access network (PAN) connection. As shown, communications subsystem includes cellular communication system 132, which includes at least one radio frequency RF front end coupled to one or more antennas. In one or more embodiments, cellular communication system 132 can include a communication module with one or more baseband processors or digital signal processors, one or more modems, and a radio frequency (RF) front end having one or more transmitters and one or more receivers. In one or more embodiments, controller 110, via communications subsystem 130, may communicate via an OTA cellular connection with radio access networks (RANs) over a cellular wireless communication network (CWCN) 175. CWCN 175 can be a terrestrial network and include a plurality of base stations and associated network server(s) 176, in one embodiment. Cellular communication system 132 allows electronic device 100 to communicate wirelessly with CWCN 175 via transmissions of communication signals (represented as lightning bolts) to and from network communication devices, such as base stations or cellular nodes, of CWCN 175. Alternatively, or in addition, CWCN 175 can include a satellite network, and electronic device 100 connects to CWCN 175 using satellite communication system 133. Cellular communication system 132 and satellite communication system 133 enable electronic device 100 to engage in long distance wireless communication capabilities.

In one or more embodiments, communications subsystem 130 includes integrated short range wireless interface chipset 134 having one or more of Wi-Fi transceiver (TxRX) 135, Bluetooth (BT) TxRx 136, near field communication (NFC) transceiver 137, and ultra-wideband (UWB) transceiver 138. In one or more embodiments, the short-range communication devices are not integrated on a single chipset, but can be separately provided hardware components. In one or more embodiments, electronic device 100 can communicate wirelessly with external wireless devices, such as a WiFi router of a wireless local area network (WLAN) 178 and/or second electronic device 170, via one or more short-range wireless interface(s). Second electronic device 170 can be a communication device, such as a smartphone that is used by a second user 171, and/or can be similarly configured as electronic device 100. In one or more embodiments, electronic device 100 can receive Internet or Wi-Fi based calls, text messages, multimedia messages, and other notifications via a combination of wireless and wired networks (generally networks 182).

In one or more embodiments, networks 182 can include CWCN 175, WLAN 178, and Wide Area Network (WAN) 180, such as the Internet. In one or more embodiments, WAN 180 can enable electronic device 100 to access application servers 190, which can provide a downloadable version of camera control module 125A and/or access to other applications, online transactions, and resources. In one or more embodiments, networks 182 can also include personal area networks (PAN) 184, which are individually created with second devices via one of short-range wireless devices from among Wi-Fi TxRX 135, BT TxRx 136, NFC transceiver 137, and UWB transceiver 138. Example second devices include external display 165, wireless headset 166, and wearable computing device 192. External display 165 can be a stand-alone monitor/display or a display integrated into a second electronic device, such as a laptop computer. In at least one embodiment, connection to the external display 165 can be wired and can include an intermediate connection device, such as a docking station device. In one or more embodiments, wearable computing device 192, such as a smartwatch, fitness tracker, or the like, may be paired with electronic device 100, and provide biometric data such as heart rate, breathing rate, and the like, to the electronic device 100 via the paired communication link.

Electronic device 100 also includes physical interface 106. Physical interface 106 of electronic device 100 can serve as a data port and can also be used as a power supply port that is coupled to charging circuitry 168, which feeds electrical power to device battery 169 to enable recharging of device battery 169 and/or powering of electronic device 100. As a data port, physical interface 106 can enable electronic device 100 to be physically coupled via a cable or docking station port to a second device, such as external display 165.

FIG. 1B presents additional details of ICD(s) 152 of electronic device 100. Throughout the disclosure, the term image capturing device (ICD) is synonymous with and/or utilized interchangeably with any one of the cameras of electronic device 100. ICD(s) (or cameras) 152 include front cameras 152*a* and rear cameras 152*b*. In one embodiment, each of front cameras 152*a* and rear cameras 152*b* are communicatively coupled to ICD controller 116. ICD controller 116 supports the processing of image data from front cameras 152*a* and rear cameras 152*b*. Front cameras 152*a* can include a main camera 152*a*1 and a wide angle camera 152*a*2. Rear cameras can include a main camera 152*b*1, a wide angle camera 152*b*2, and a telephoto camera 152*b*3. Both sets of cameras 152 include image sensors that can capture images that are within the field of view (FOV) of each respective camera 152. In one or more embodiments, one or more of the cameras can be utilized to enable biometric authentication using facial image or iris scan recognition.

In one embodiment, main cameras 152*a*1 and 152*b*1 can be low resolution (i.e., a low number of pixels) always on cameras (AoC) that continuously capture images and have a low level of power consumption. Wide angle cameras 152*b*, 152*b*2, and telephoto camera 152*b*3 can be high resolution cameras (i.e., a high number of pixels) that only capture images when triggered and have a higher level of power consumption.

In the description of each of the following figures, reference is also made to specific components illustrated within the preceding figure(s). Similar or same components are presented with the same leading reference number.

Figure 2:
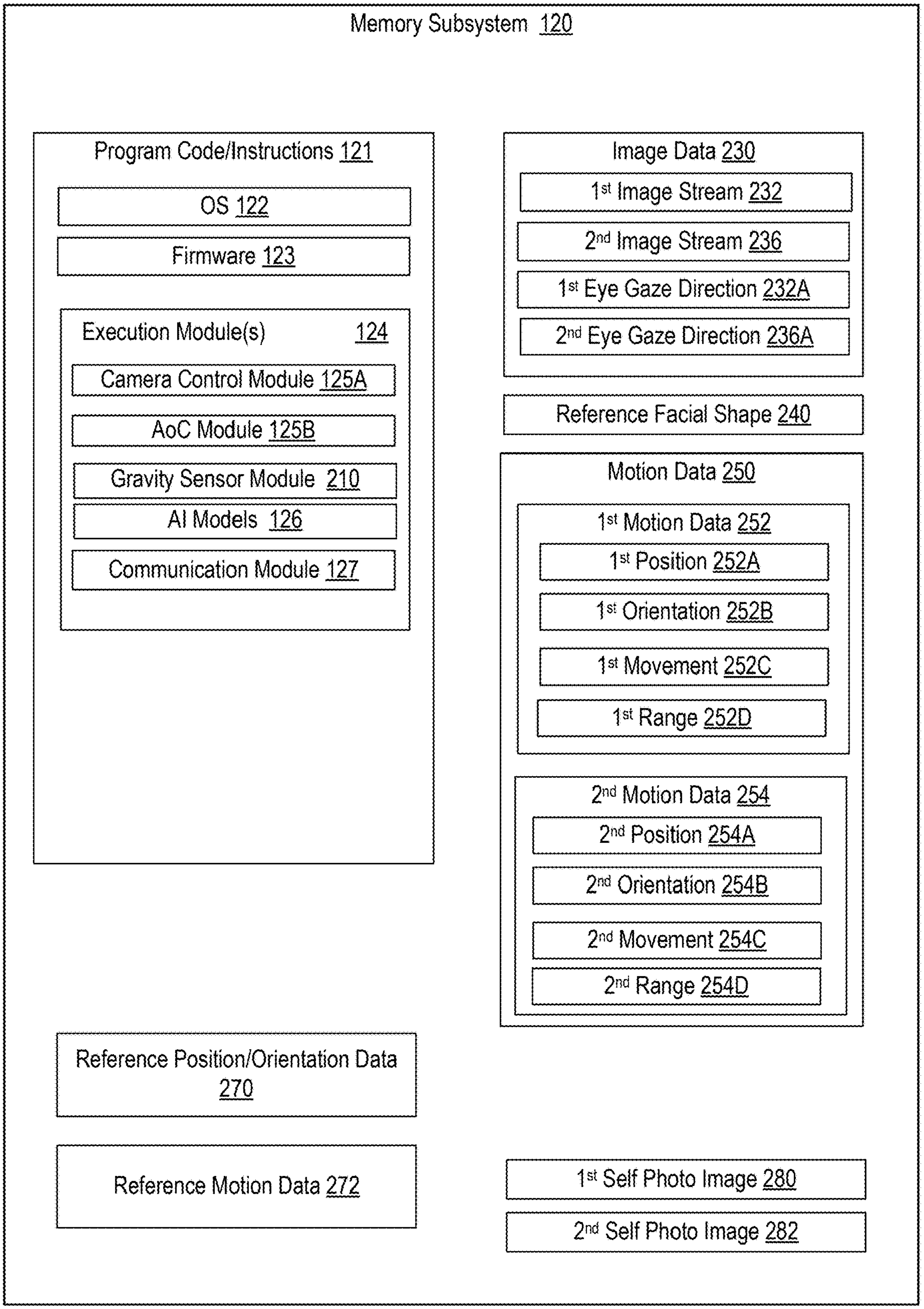
FIG. 2 is a block diagram of example contents of the memory subsystem of the example electronic device of FIG. 1A-1B (FIG. 1), which enables or supports completion of the various processes described herein, according to one or more embodiments.

Referring to FIG. 2, there is shown one embodiment of example contents of memory subsystem 120 of electronic device 100 configured to complete the various processes described herein. Memory subsystem 120 includes program code/instructions 121 including data, software, and/or firmware modules, such as operating system (OS) 122, firmware 123, execution module(s) 124. Execution module(s) 124 include camera control module 125A, AoC module 125B, AI models 126, communication module 127, and gravity sensor module 210.

Camera control module 125A includes program code that is executed by processor 112 to enable electronic device 100 to perform the various features of the present disclosure. In one or more embodiments, camera control module 125A enables electronic device 100 to capture self-photos when the camera is in an always on camera mode. Gravity sensor module 210 enables electronic device 100 to calculate/determine the orientation and position of the electronic device based on motion data received from one or more motion sensor(s) (e.g., motion sensor 158*a*, accelerometer 158*b*, and/or gyroscope 158*c*). Gravity sensor module 210 calculates the force of gravity acting on electronic device 100 to determine the direction and magnitude of the force of gravity acting on electronic device 100. Gravity sensor module 210 is used to determine position and orientation of electronic device 100 relative to the Earth.

In one or more embodiments, execution of camera control module 125A and gravity sensor module 210 by processor 112 configures electronic device 100 to perform the processes presented in the flowchart of FIG. 6, as will be described below. AI models 126 accelerate functions of camera control module 125A and gravity sensor module 210 to capture self-photo images using a camera operating in an AoC operating mode. In one embodiment, AI models 126 improve processes for monitoring and detecting when the eye gaze direction of the user is looking in the direction of the AoC contemporaneously with detecting that the electronic device is positioned within pre-established orientation parameters and distance to the camera that corresponds to the user preparing to take a self-photo. Communication module 127 enables electronic device 100 to communicate and exchange data with other devices via networks 182.

Memory subsystem 120 includes image data 230 and reference facial shape image 240.

Image data 230 can be captured by one or more cameras 152 of electronic device 100. Image data 230 includes first image stream 232, second image stream 236, first eye gaze direction 232A, and second eye gaze direction 236A. In one embodiment, first image stream 232 and second image stream 236 are captured by one or more cameras 152 of electronic device 100 that are operating in an always on camera mode (AoC) to continuously capture one or more image streams. In one embodiment, first image stream 232 and second image stream 236 can comprise multiple images that are captured over a period of time.

Eye gaze directions 232A, 236A are the direction that a user of electronic device 100 is looking relative to electronic device 100. In one embodiment, electronic device 100 can detect the presence of eyes within a field of view (FOV) of one or more cameras 152, and electronic device 100 can use the detected presence of the eyes relative to the location of the device and/or the camera lens to identify precise eye positions and to determine an eye gaze direction based on the eye positions.

In one embodiment, eye gaze direction 232A, 236A are determined after the users gaze has rested (i.e., remained constant) for a preset minimum amount of time. In one embodiment, eye gaze directions 232A, 236A can be defined as an angular value from the planar front surface or rear surface of electronic device 100. In this example, 0 degrees can be defined as a straight ahead direction that is perpendicular to the front and rear surfaces of electronic device 100. Reference facial shape image 240 is a pre-determined image presenting a shape that indicates that an image stream contains one or more faces of one or more individuals.

Memory subsystem 120 includes motion data 250, reference position/orientation data 270, and reference motion data 272. Motion data can be sensed and/or detected by one or more motion and other sensors 157 of electronic device 100. Motion data 250 includes first motion data 252 and second motion data 254. Motion data 250 indicates the spatial orientation, position and movement of electronic device 100. First motion data 252 includes first position 252A, first orientation 252B, first movement 252C, and first range 252D. First position 252A corresponds to a first position/location of electronic device 100. First orientation 252B corresponds to a first orientation of electronic device 100 relative to the earth. First movement 252C corresponds to a first movement of electronic device 100 between two positions and/or orientations. First range 252D corresponds to a first distance between the camera and the user's face.

Second motion data 254 includes second position 254A, second orientation 254B and second movement 254C, and second range 252D. Second position 254A corresponds to a second position/location of electronic device 100. Second orientation 254B corresponds to a second orientation of electronic device 100 relative to the earth. Second movement 254C corresponds to a second movement of electronic device 100 between two positions and/or orientations. Second range 254D corresponds to a second distance between the camera and the user's face. In one embodiment, proximity sensor 159*a* can at least partially sense/measure first range 252D and second range 254D.

Reference position/orientation data 270 are pre-determined positions/orientations and range of electronic device 100 that are identified as being aligned to capture a self-photo image. Reference position/orientation data 270 includes one or more positions and orientations of electronic device 100 that indicate that a camera of the electronic device is in an alignment to capture a self-photo image of a user. Reference motion data 272 are pre-determined motions/movement of electronic device 100 that are identified as corresponding to being aligned to capture a self-photo image.

Memory subsystem 120 includes first self-photo 280 and second self-photo 282. First self-photo 280 is an image automatically captured by electronic device 100 operating in an AoC mode, in response to determining the electronic device is oriented within first orientation 252B, while a user has a first eye gaze direction 232A that is looking towards the direction of at least one of the cameras 152. In one embodiment, first self-photo 280 can be captured by front main camera 152*a*1. Second self-photo 282 is an image automatically captured by electronic device 100 operating in an AoC mode, in response to determining the electronic device is oriented within second orientation 254B, while a user has a second eye gaze direction 236A that is looking towards the direction of at least one of cameras 152. In one embodiment, second self-photo 282 can be captured by rear wide angle camera 152*b*2 and be a wide angle self-photo image. In an embodiment, changing the camera to use rear wide angle camera 152*b*2 provides a wide angle FOV that can capture a larger FOV within the second self-photo 282 and/or provide a better self-photo image.

Figure 3:
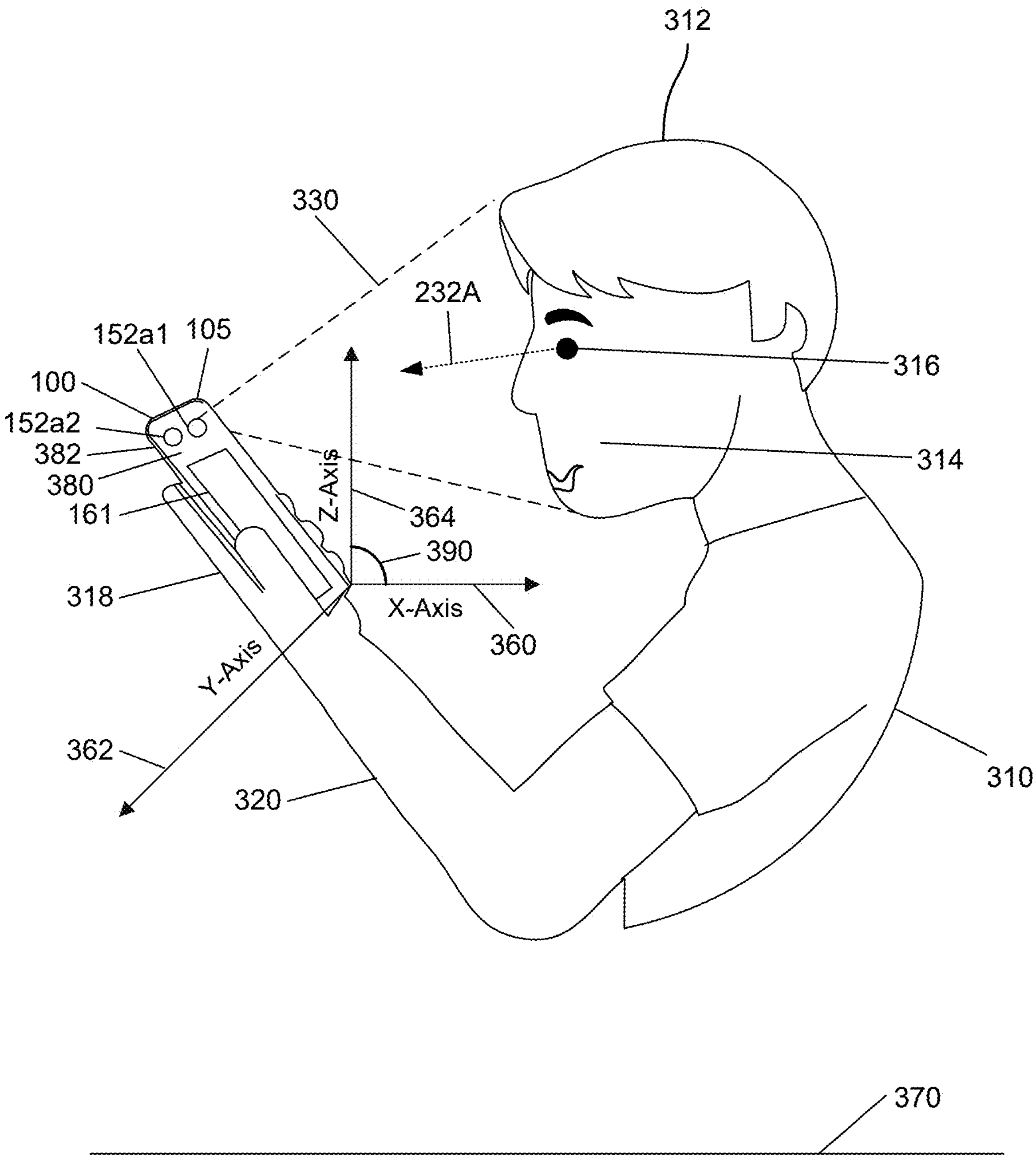
FIG. 3 is an example illustration of an electronic device being held by a user to capture a self-photo in response to detecting an eye gaze direction within a field of view (FOV) of an always-on front camera and an image-capturing orientation of the electronic device, according to one or more embodiments.

FIG. 3 illustrates an example of a user 310 holding electronic device 100 in their hand 318 while looking toward front camera 152*a*1. Electronic device 100 includes housing 105 having a front surface 380 and a rear surface 382. Electronic device 100 includes main front camera 152*a*1 and wide angle front camera 152*a*2. In one embodiment, front cameras 152*a*1 and 152*a*2 can be partially embedded within front surface 380. Head 312 and face 314 of user 310 is shown within a field of view (FOV) 330 of front camera 152*a*1. The user 310 can also look at or view display 161 of electronic device 100. In one embodiment, electronic device 100 can operate in an always on mode and periodically capture an image stream or images using front camera 152*a*1, including the face 314 of user 310, when the face 314 of the user 310 is within FOV 330.

The face 314 of the user 310 includes a pair of eyes 316 that are looking in first eye gaze direction 232A. In FIG. 3, the user is looking towards, or at, front camera 152*al* along first eye gaze direction 232A. In one embodiment, camera control module 125 enables electronic device 100 to determine if a first image stream 232 captured via the front camera 152*al* contains a face 314 of a user 310. In response to determining the first image stream 232 contains the face 314 of the user, electronic device 100 determines whether a first eye gaze direction 232A of the user 310 corresponds to a direction of the front camera 152*a*1. Electronic device 100 can track the first eye gaze direction 232A of user 310 by monitoring and analyzing the first image stream 232 from front camera 152*a*1 to determine the first eye gaze direction 232A. More specifically, camera control module 125 enables electronic device 100 to detect the presence of eyes 316 within a FOV 330 of front facing camera 152*a*1, to identify precise eye positions, and to determine an eye gaze direction based on the eye positions.

In one embodiment, processor 112 does not determine first eye gaze direction 232A until the user's gaze has rested on a specific area for more than 1-2 seconds. The exact value of the preset minimum amount of time can be a variable that has a default value or a value based on the current device/application setting. The setting can further be modified/adjusted by the user, using a presented settings GUI to be more or less sensitive to changes in eye gaze direction.

User 310 can move and/or rotate electronic device 100 in multiple directions and axes using their arm 320 and hand 318. User 310 can move and/or rotate electronic device 100 along an axis system including an x-axis 360, a y-axis 362 and a z-axis 364. In FIG. 3, the z-axis 364 is shown as being perpendicular to the ground or earth 370. Motion sensors 157 can sense motion data 250 that corresponds to the position and orientation of electronic device 100 in each axis (e.g., x-axis 360, y-axis 362, and z-axis 364). Gravity sensor module 210 can calculate the movement, position and orientation of electronic device 100 relative to the earth based on motion data 250.

In one embodiment, gravity sensor module 210 enables electronic device 100 to detect, via motion sensor 157, movement of the electronic device 100 and to analyze motion data 250 for specific movements and orientation of the electronic device 100 corresponding to an orientation conducive to capturing a self-photo with a camera (e.g. front camera 152*a*1). In response to determining that the motion data indicates the electronic device is in the orientation conducive to capturing a self-photo with the camera, electronic device 100 initiates sampling of the first image stream 232 to determine whether the first image stream 232 captured via the front camera 152*a*1 contains a face of a user.

In one embodiment, the orientation conducive to capturing a self-photo with at least one of the front cameras can be when the orientation and range is at an angle 390 that is between 75 degrees and 105 degrees in the Z-axis 364, as measured from the axis of the earth 370 (i.e., parallel to the earth).

Figure 4:
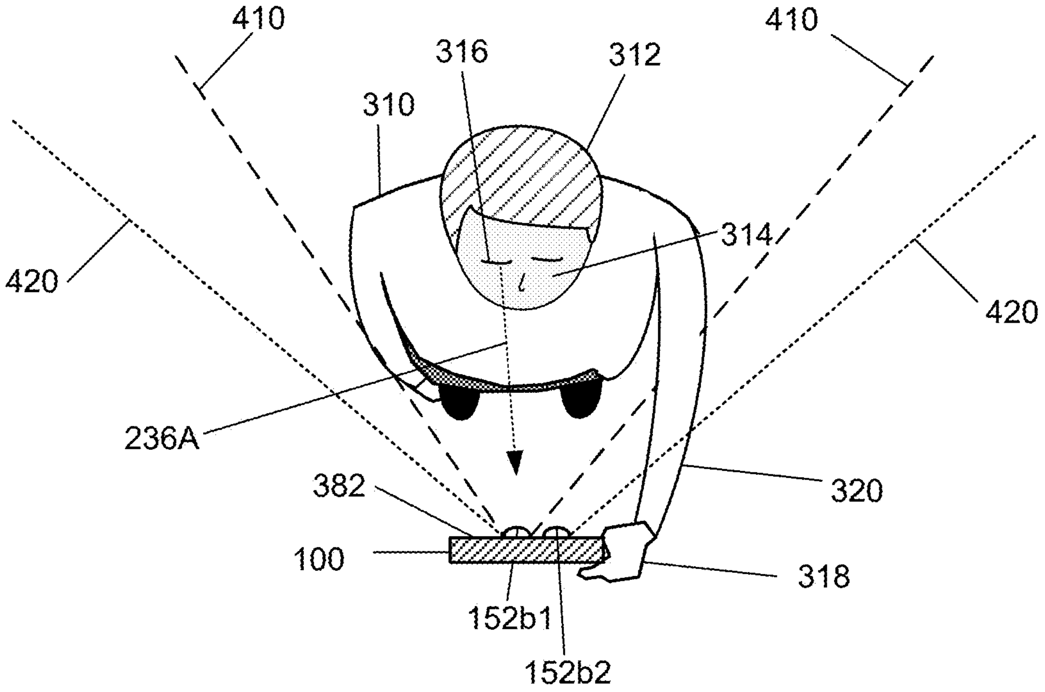
FIG. 4 is an example illustration of an electronic device being held by a user to capture a self-photo in response to detecting an eye gaze direction within a FOV of an always-on rear camera and an image-capturing orientation of the electronic device, according to one or more embodiments.

FIG. 4 illustrates an example of a user 310 holding electronic device 100 in their hand 318 while looking toward rear camera 152*b*1. Electronic device 100 includes housing 105 having an outer or rear surface 382. Electronic device 100 includes main rear camera 152*b*1 and wide angle rear camera 152*b*2. In one embodiment, rear cameras 152*b*1 and 152*b*2 can be partially embedded within rear surface 382. In one embodiment, electronic device 100 can be a foldable electronic device and rear cameras **152*b*1 and 152*b*2 face outward, when electronic device 100** is in the folded position.

Head 312 and face 314 of user 310 is shown within a FOV 410 of rear main camera **152*b*1. Head 312 and face 314 of user 310 is also shown within a FOV 420 of rear wide angle camera 152*b*2. FOV 420 captures a larger area than FOV 410. In one embodiment, electronic device 100 can operate in an always on mode and periodically capture an image stream or images using rear main camera 152*b*1, including the face 314 of user 310, when the face 314 of the user 310 is within FOV 410**.

In FIG. 4, the user is looking towards, or at, rear main camera **152*b*1 along second eye gaze direction 236A. In one embodiment, camera control module 125 enables electronic device 100 to determine if a second image stream 236 captured via the rear main camera 152*b*1 contains a face 314 of a user 310. In response to determining the second image stream 236 contains the face 314 of the user, electronic device 100 determines whether a second eye gaze direction 236A of the user 310 corresponds to a direction of the rear main camera 152*b*1. Electronic device 100 can track the second eye gaze direction 236A of user 310 by monitoring and analyzing the second image stream 236 from rear main camera 152*b*1 to determine the second eye gaze direction 236**A.

According to one aspect of the disclosure, camera control module 125A and gravity sensor module 210 can enable electronic device 100 to determine if electronic device 100 is oriented within a reference position, orientation and range 270, (i.e., angle 390 is between 75 degrees and 105 degrees) while the user 310 is looking towards the direction of rear main camera **152*b*1. In response to determining electronic device 100 is oriented within the reference position, orientation and range 270 and the user 310 is looking towards the direction of rear main camera 152*b*1, electronic device 100 actives wide angle camera 152*b*2 and captures, via wide angle camera 152*b*2, second self-photo image 282 and stores the self-photo image 282 to memory subsystem 120. In one embodiment, electronic device 100 can use the higher resolution of wide angle camera 152*b*2** to capture a higher resolution and better quality self-photo image.

Figure 5:
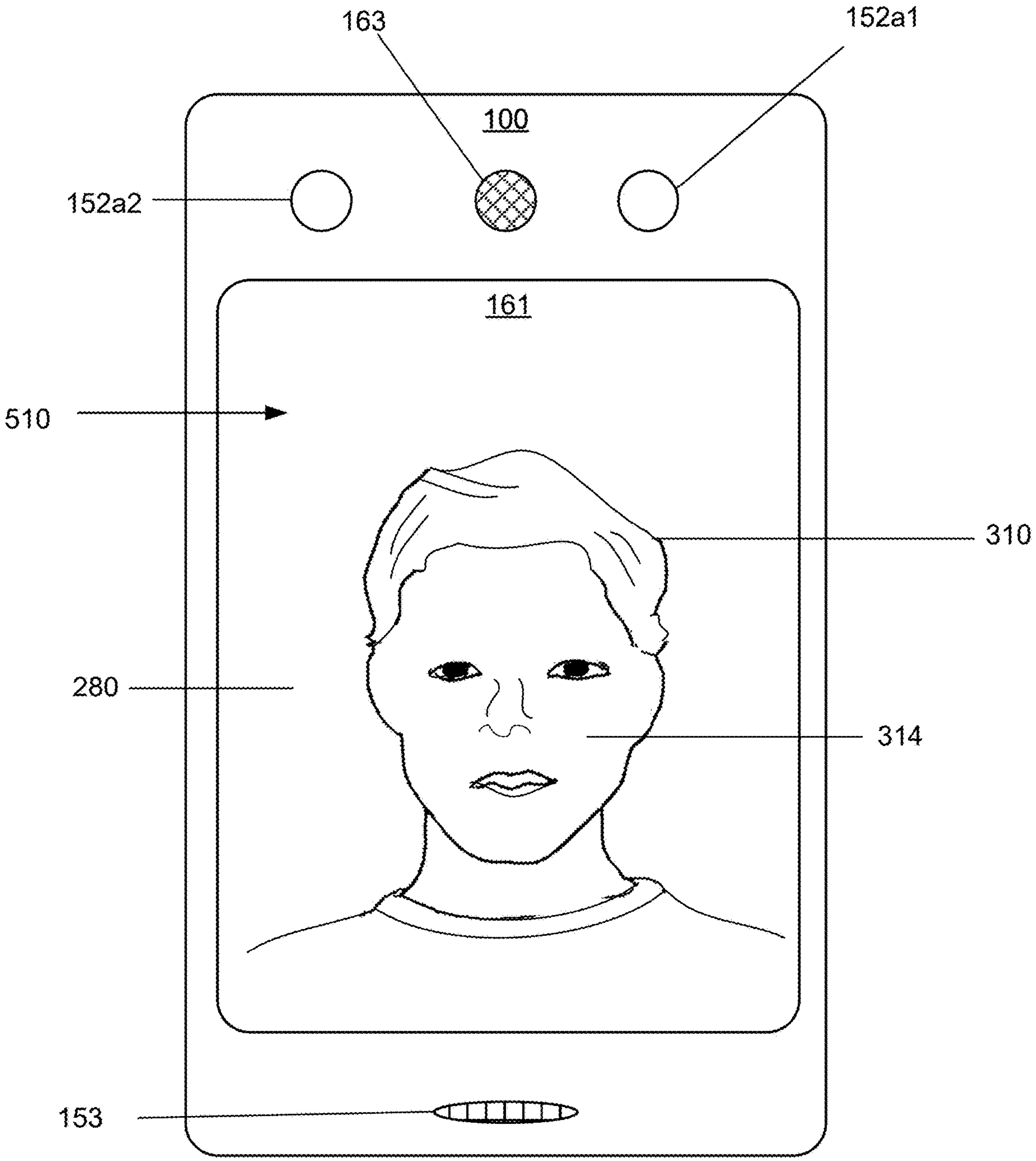
FIG. 5 is an example illustration of a display of an electronic device presenting an image user interface that includes a self-photo, according to one or more embodiments.

Referring to FIG. 5, electronic device 100 is illustrated with an example image capturing user interface (ICUI) 510 presented on display 161. After capturing a self-photo image, electronic device 100 can present ICUI 510, including the first self-photo image 280 of user 310. First self-photo image 280 was automatically captured by electronic device 100 using front main camera **152*a*1, while the eye gaze direction of the user was looking at the front main camera 152*a*1 and the position/orientation of the electronic device matched the reference position/orientation data 270**.

According to one aspect of the disclosure, while electronic device 100 is operating in an always on camera (AoC) mode, electronic device 100 determines, via at least one processor 112 of the electronic device, if a first image stream 232 captured via a camera **152*al* of the electronic device contains a first face 314 of a first user 310. In response to determining the first image stream 232 contains the face of the first user, electronic device 100 determines whether a first eye gaze direction 232A of the first user corresponds to a direction of the camera 152*a*1. In response to determining the first user is looking towards the direction of the first camera 152*a*1, electronic device 100 determines if the electronic device is oriented within a reference position/orientation and range 270 that corresponds with the first user taking a self-image. In response to determining the electronic device is oriented within the reference position/orientation and range 270, while the first user is looking towards the direction of the first camera, electronic device 100 captures, via camera 152*a*1, a first self-photo image 280 and stores the self-photo image 280**.

According to another aspect of the disclosure, to determine if electronic device 100 is oriented within the reference position/orientation and range, electronic device 100 receives first orientation data 252B from at least one motion sensor 157. Electronic device 100 retrieves reference position/orientation data 270 corresponding to an orientation and range for taking a self-photo. Electronic device 100 determines if the first orientation data 252B substantially matches the reference position/orientation data 270. In response to determining that the first orientation data 252B substantially matches the reference position/orientation data 270, electronic device 100 triggers capture and storage of the self-photo image 280. It is appreciated that matching refers to being values within a numerical range of acceptable values for both orientation and distance range. An infinite number of variations is thus possible within the given numerical ranges of orientation and distance range.

According to an additional aspect of the disclosure, prior to determining if the first image stream 232 captured via camera **152*a*1 contains the face 314 of the first user 310, electronic device 100 detects, via at least one motion sensor 157, movement of the electronic device and analyzes movement data (e.g. motion data 250) for specific movements and orientation of the electronic device corresponding to an orientation conducive to capturing a self-photo with camera 152*a*1. In response to determining that the movement and orientation data (e.g. motion data 250) indicates the electronic device is in the orientation conducive to capturing a self-photo with camera 152*a*1, electronic device 100 initiates sampling of the first image stream 232 to determine whether the first image stream 232 captured via camera 152*a*1** contains the face of the first user.

According to one more aspect of the disclosure, prior to determining if the first image stream 232 captured via camera **152*a*1 contains the face 314 of the first user 310, electronic device 100 receives motion data 250 from motion sensors 157 and determines if the electronic device is being moved by the first user 310 based on the motion data. In response to determining that the electronic device is being moved by the first user, electronic device 100 initiates sampling of the first image stream 232 to determine whether the first image stream captured via camera 152*a*1 contains the face 314 of the first user 310**.

According to yet another aspect of the disclosure, electronic device 100 includes a gravity sensor module 210 for calculating at least one orientation of the electronic device. Electronic device 100 receives first motion data 252 from motion sensor 157 and calculates the first orientation data 252B based on the first motion data 252. The first orientation data 252B includes a first orientation of the electronic device in a first axis that is measured parallel to the earth 370.

According to one more additional aspect of the disclosure, electronic device 100 can track the first eye gaze direction 232A of the first user 310 by monitoring and analyzing the first image stream 232 from camera **152*a*1 to determine the first eye gaze direction 232**A.

Figure 6:
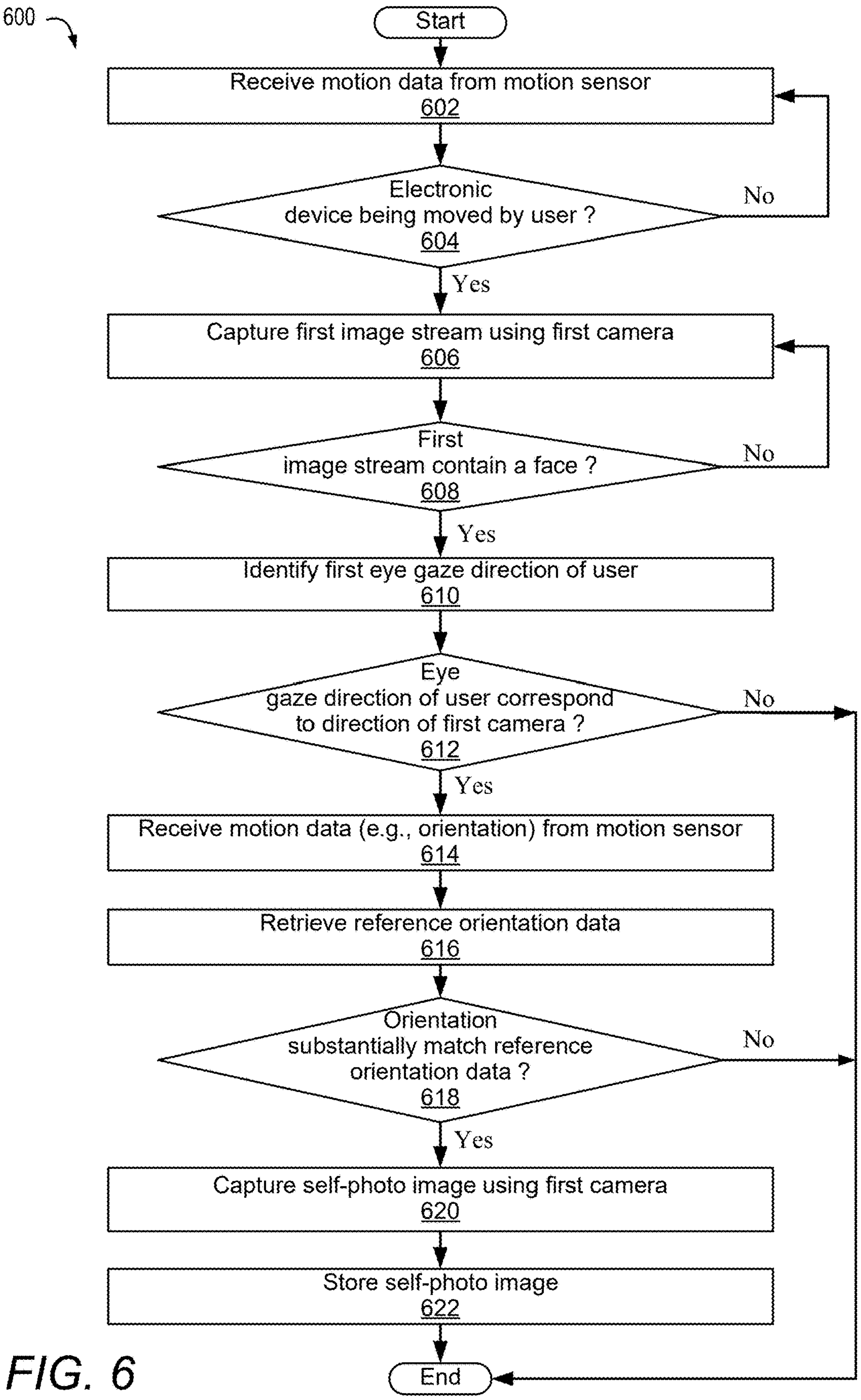
FIG. 6 depicts a flowchart of a method by which an electronic device captures a self-photo image using an always on camera of the electronic device, according to one or more embodiments.

FIG. 6 depicts method 600 by which electronic device 100 is triggered to automatically capture a self-photo image while in an AoC operating mode in response to detecting a face in an image stream and detecting a position (or movement) of the device into an orientation and at a distance range from the user's face that is conducive to capturing a self-photo. The description of method 600 will be described with reference to the components and examples of FIGS. 1-5. The operations depicted in FIG. 6 can be performed by electronic device 100 or any suitable electronic device that includes the one or more functional components of electronic device 100 that provide/enable the described features. One or more of the processes of the methods described in FIG. 6 may be performed by processor 112 executing program code associated with camera control module 125A and gravity sensor module 210.

With specific reference to FIG. 6, method 600 begins at the start block. At block 602, method 600 includes receiving motion data (e.g., first motion data 252) from motion sensors 157. Method 600 includes determining if the electronic device is being moved by a user based on the motion data (decision block 604). In one embodiment, electronic device 100 can compare previous motion data with the current motion data (e.g., first motion data 252) to determine if the electronic device is being moved. In one or more embodiments, the detected motion is motion being completed by a hand of the user. In one or more embodiments, the electronic device includes a grip sensor that enables the electronic device to determine that the device is being held by the user's hands. Accordingly, the one or more embodiments can include the processor further determining that the device is being held by the user's hand and is being placed in the specific orientation and distance range, where the combination of these determinations/detections are indicative of the user preparing to take a self-photo image.

In response to determining that the electronic device is not being moved, method 600 continues to receive motion data from motion sensors 157 at block 602. In response to determining that the electronic device is being moved, method 600 includes capturing first image stream 232 via front camera **152*a*1 (block 606). In one embodiment, front camera 152*a*1 is an AoC that is always activated and the first image stream 232 is thus automatically captured. Method 600 includes determining (by analyzing the image stream) if the first image stream 232 captured via front camera 152*a*1 of the electronic device contains a face 314 of a user 310 (decision block 608). In response to determining the first image stream 232 does not contains the face of a user, method 600 returns to block 606 to continue capturing additional image streams via the AoC 152*a*1**.

In response to determining the first image stream 232 contains the face 314 of user 310, method 600 includes identifying a first eye gaze direction 232A of the user (block 610). Method 600 includes determining whether the first eye gaze direction 232A of the user corresponds to a direction of the front camera **152*al* (decision block 612). In response to determining the user is not looking towards the direction of the front camera 152*a*1, method 600 ends at the end block. In response to determining the user is looking towards the direction of the front camera 152*a*1, method 600 includes receiving/determining current device position/orientation data 250 (e.g., second position 254A and/or second orientation 254B) (block 614) and retrieving reference position/orientation data 270 (block 616**).

Method 600 includes determining if the second position 254A and/or orientation 254B substantially matches the reference position/orientation data 270 (decision block 618). In one embodiment, method 600 can determine if the electronic device is oriented within a reference position/orientation and range 270 that corresponds with the first user taking a self-image or self-photo. In response to determining that the second orientation 254B does not substantially match the reference position/orientation data 270, method 600 terminates at the end block.

In response to determining that the second orientation 254B substantially matches the reference position/orientation data 270, method 600 includes capturing, via camera **152*a*1, a first self-photo image 280 (block 620) and storing the first self-photo image 280 to memory subsystem 120 (block 622). Method 600** ends at the end block.

The disclosure enables an electronic device operating with a camera in an AoC mode to automatically capture a self-photo without manual input from a user. The disclosure enables an electronic device to detect when the eye gaze direction of a user is looking in the direction of a camera and contemporaneously determine if the electronic device is oriented within an orientation and distance range that corresponds to a user taking a self-photo. In response to determining the user is looking towards the direction of the camera and the electronic device is oriented within an orientation and range that corresponds to a user taking a self-photo, the electronic device automatically captures and stores a self-photo image. The disclosure enables an electronic device to capture a self-photo without a user having to manually touch a button or touch input screen.

In the above-described method of FIG. 6, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined primarily by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. An electronic device comprising:

a first camera;

a memory; and a processor communicatively coupled to each of the first camera and the memory, and which is configured to cause the electronic device to:

while the electronic device is operating in an always on camera (AoC) mode, determine if a first image stream captured via the first camera contains a face of a first user;

in response to determining the first image stream contains the face of the first user, determine whether a first eye gaze direction of the first user corresponds to a direction of the first camera;

in response to determining the first user is looking towards the direction of the first camera, determine if the electronic device is oriented within a first orientation and is within a first range that corresponds with the first user taking a self-image, wherein the first range is a distance between the electronic device and the face of the user; and in response to determining the electronic device is oriented within the first orientation and is in the first range, while the first user is looking towards the direction of the first camera, capture, via the first camera, a self-photo image and store the self-photo image.

2. The electronic device of claim 1, further comprising:

at least one motion sensor that is communicatively coupled to the at least one processor, and wherein to determine if the electronic device is oriented within the first orientation and range, the at least one processor is configured to cause the electronic device to:

receive first orientation data from the at least one motion sensor;

retrieve reference orientation data corresponding to an orientation and range for taking a self-photo;

determine if the first orientation data substantially matches the reference orientation data; and in response to determining that the first orientation data substantially matches the reference orientation data, trigger capture and storage of the self-photo image.

3. The electronic device of claim 2, wherein the at least one processor is configured to cause the electronic device to, prior to determining if the first image stream captured via the first camera contains the face of the first user:

detect, via the at least one motion sensor, movement of the electronic device;

analyze movement data for specific movements and orientation of the electronic device corresponding to an orientation conducive to capturing a self-photo with the first camera; and in response to determining that the movement and orientation data indicates the device is in the orientation conducive to capturing a self-photo with the first camera, initiate sampling of the first image stream to determine whether the first image stream captured via the first camera contains the face of the first user.

4. The electronic device of claim 2, wherein the at least one processor is configured to cause the electronic device to, prior to determining if the first image stream captured via the first camera contains the face of the first user:

receive motion data from the at least one motion sensor;

determine if the electronic device is being moved by the first user based on the motion data; and in response to determining that the electronic device is being moved by the first user, initiate sampling of the first image stream to determine whether the first image stream captured via the first camera contains the face of the first user.

5. The electronic device of claim 2, wherein the memory has stored thereon a gravity sensor module for calculating at least one orientation of the electronic device, and the at least one processor is configured to cause the electronic device to:

receive first motion data from the at least one motion sensor; and calculate the first orientation data based on the first motion data, the first orientation data including a first orientation of the electronic device in a first axis that is parallel to the earth.

6. The electronic device of claim 1, further comprising:

a second camera that is communicatively coupled to the at least one processor, and wherein the at least one processor is configured to cause the electronic device to:

in response to determining the electronic device is oriented within the first orientation and range, while the first user is looking towards the direction of the first camera: activate the second camera; capture, via the second camera, the self-photo image; and store the self-photo image.

7. The electronic device of claim 1, wherein the at least one processor is configured to cause the electronic device to:

track the first eye gaze direction of the first user by monitoring and analyzing the first image stream from the first camera to determine the first eye gaze direction.

8. The electronic device of claim 1, wherein the first orientation is between 75 degrees and 105 degrees in a first axis that is parallel to the earth.

9. A method comprising:

while an electronic device is operating in an always on camera (AoC) mode, determining, via at least one processor of the electronic device, if a first image stream captured via a first camera of the electronic device contains a face of a first user;

in response to determining the first image stream contains the face of the first user, determining whether a first eye gaze direction of the first user corresponds to a direction of the first camera;

in response to determining the first user is looking towards the direction of the first camera, determining if the electronic device is oriented within a first orientation and in a first range that corresponds with the first user taking a self-image, wherein the first range is a distance between the electronic device and the face of the user; and in response to determining the electronic device is oriented within the first orientation and in the first range, while the first user is looking towards the direction of the first camera, capturing, via the first camera, a self-photo image and storing the self-photo image.

10. The method of claim 9, further comprising:

receiving first orientation data from at least one motion sensor;

retrieving reference orientation data corresponding to an orientation and range for taking a self-photo;

determining if the first orientation data substantially matches the reference orientation data; and in response to determining that the first orientation data substantially matches the reference orientation data, triggering capture and storage of the self-photo image.

11. The method of claim 10, further comprising:

wherein prior to determining if the first image stream captured via the first camera contains the face of the first user:

detecting, via the at least one motion sensor, movement of the electronic device;

analyzing movement data for specific movements and orientation of the electronic device corresponding to an orientation conducive to capturing a self-photo with the first camera; and in response to determining that the movement and orientation data indicates the device is in the orientation conducive to capturing a self-photo with the first camera, initiating sampling of the first image stream to determine whether the first image stream captured via the first camera contains the face of the first user.

12. The method of claim 10, further comprising:

wherein prior to determining if the first image stream captured via the first camera contains the face of the first user:

receiving motion data from the at least one motion sensor;

determining if the electronic device is being moved by the first user based on the motion data; and in response to determining that the electronic device is being moved by the first user, initiating sampling of the first image stream to determine whether the first image stream captured via the first camera contains the face of the first user.

13. The method of claim 10, further comprising:

receiving first motion data from the at least one motion sensor; and calculating the first orientation data based on the first motion data, the first orientation data including a first orientation of the electronic device in a first axis that is parallel to the earth.

14. The method of claim 9, further comprising:

in response to determining the electronic device is oriented within the first orientation and range, while the first user is looking towards the direction of the first camera: activating a second camera; capturing, via the second camera, the self-photo image; and storing the self-photo image.

15. The method of claim 9, further comprising:

tracking the first eye gaze direction of the first user by monitoring and analyzing the first image stream from the first camera to determine the first eye gaze direction.

16. The method of claim 9, wherein the first orientation is between 75 degrees and 105 degrees in a first axis that is parallel to the earth.

17. A computer program product comprising:

a non-transitory computer readable storage device having stored thereon program code which, when executed by at least one processor of an electronic device having a first camera, configures the electronic device to complete the functionality of:

while the electronic device is operating in an always on camera (AoC) mode, determining if a first image stream captured via the first camera contains a face of a first user;

in response to determining the first image stream contains the face of the first user, determining whether a first eye gaze direction of the first user corresponds to a direction of the first camera;

in response to determining the first user is looking towards the direction of the first camera, determining if the electronic device is oriented within a first orientation and within a first range that corresponds with the first user taking a self-image, wherein the first range is a distance between the electronic device and the face of the user; and in response to determining the electronic device is oriented within the first orientation and is in the first range, while the first user is looking towards the direction of the first camera, capturing, via the first camera, a self-photo image and storing the self-photo image.

18. The computer program product of claim 17, wherein the program code further configures the electronic device to complete the functionality of:

receiving first orientation data from at least one motion sensor;

retrieving reference orientation data corresponding to an orientation and range for taking a self-photo;

determining if the first orientation data substantially matches the reference orientation data; and in response to determining that the first orientation data substantially matches the reference orientation data, triggering capture and storage of the self-photo image.

19. The computer program product of claim 18, wherein the program code further configures the electronic device to complete the functionality of:

wherein prior to determining if the first image stream captured via the first camera contains the face of the first user:

detecting, via the at least one motion sensor, movement of the electronic device;

analyzing movement data for specific movements and orientation of the electronic device corresponding to an orientation conducive to capturing a self-photo with the first camera; and in response to determining that the movement and orientation data indicates the device is in the orientation conducive to capturing a self-photo with the first camera, initiating sampling of the first image stream to determine whether the first image stream captured via the first camera contains the face of the first user.

20. The computer program product of claim 18, wherein the program code further configures the electronic device to complete the functionality of:

wherein prior to determining if the first image stream captured via the first camera contains the face of the first user:

receiving motion data from the at least one motion sensor;

determining if the electronic device is being moved by the first user based on the motion data; and in response to determining that the electronic device is being moved by the first user, initiating sampling of the first image stream to determine whether the first image stream captured via the first camera contains the face of the first user.

* * * * *